Sept. 8, 1953      I. STEES      2,651,096
PORTABLE MOLD
Filed Aug. 15, 1951      2 Sheets-Sheet 2
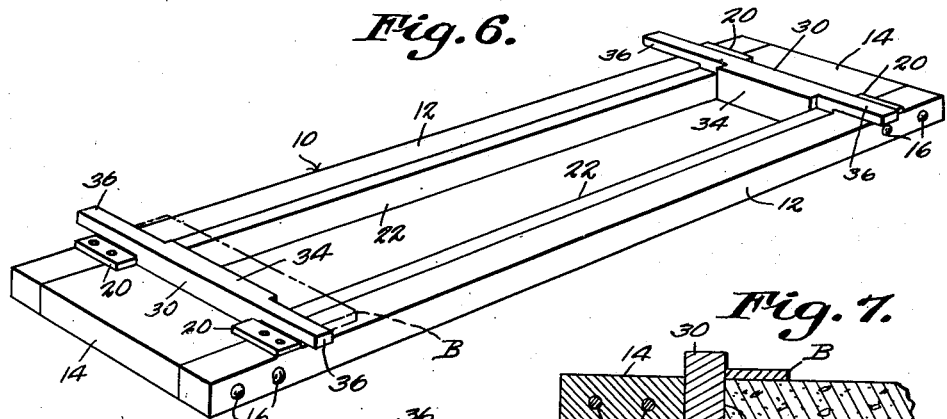
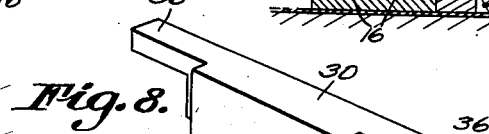
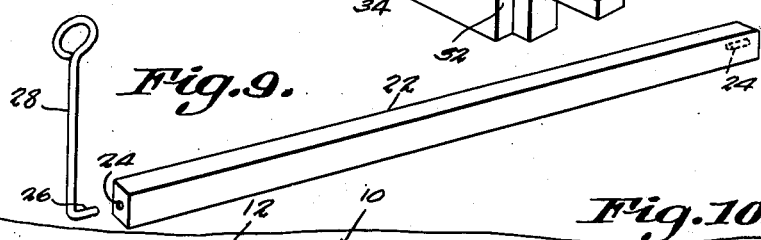
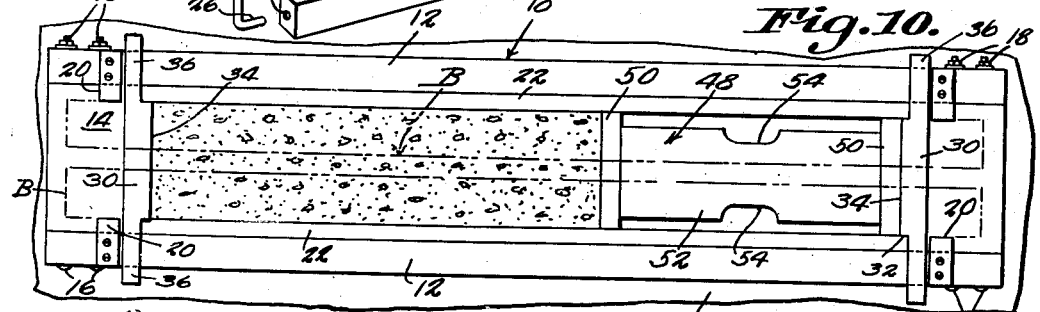
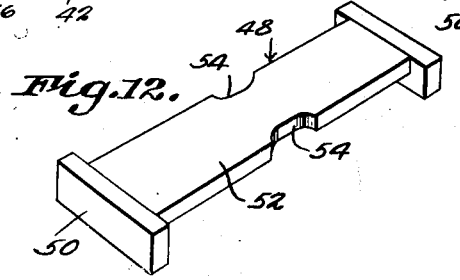
Isaac Stees
INVENTOR
BY *Cahrow Co.*
ATTORNEYS.

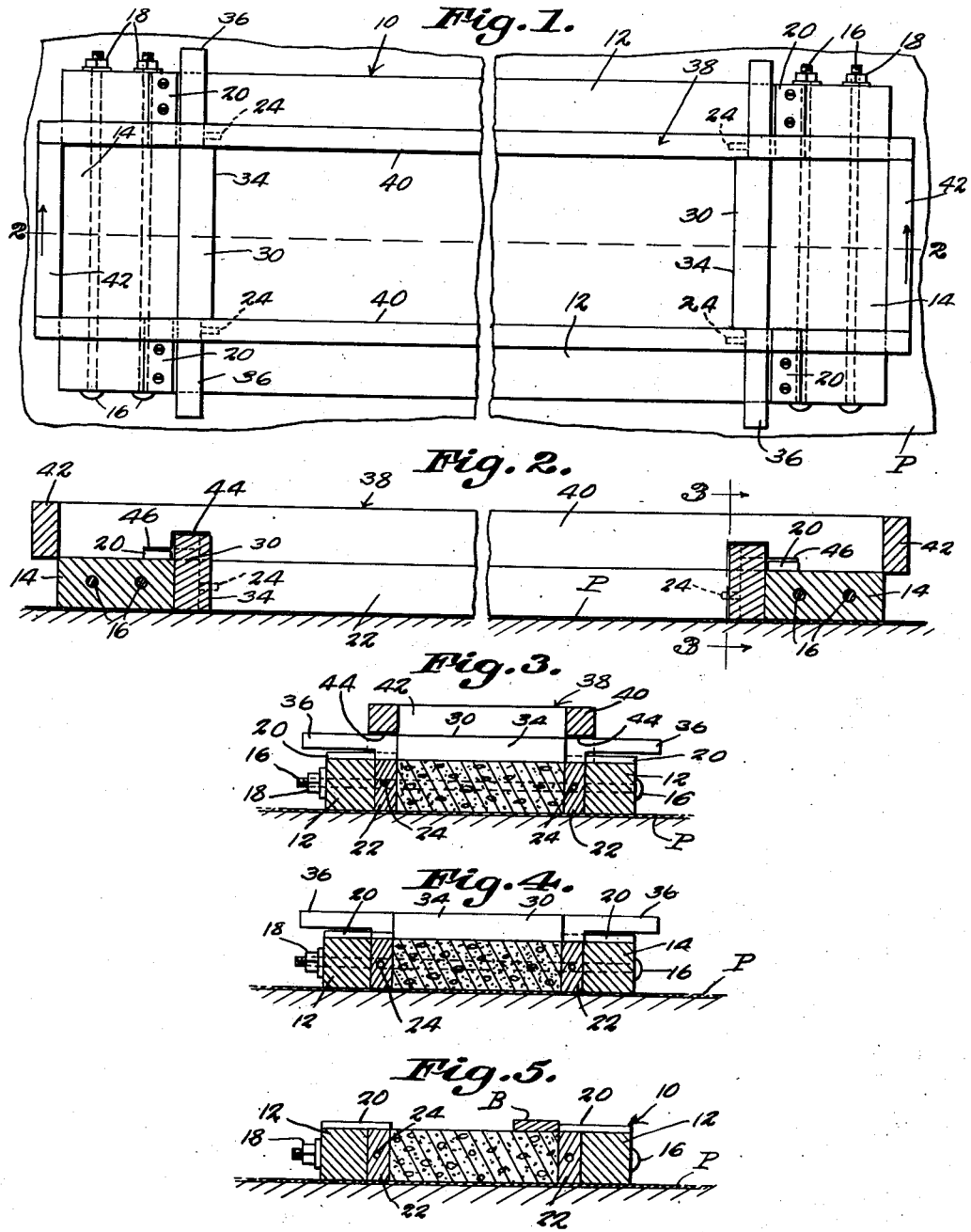

Patented Sept. 8, 1953

2,651,096

UNITED STATES PATENT OFFICE 2,651,096

PORTABLE MOLD

Isaac Stees, Harrisburg, Pa.

Application August 15, 1951, Serial No. 241,907

2 Claims. (Cl. 25—119)

This invention relates to a portable mould and more particularly to a mould of the type for producing slabs of plastic material such as concrete.

It frequently happens that a mason in constructing a building structure is confronted with the necessity of using a slab, as for instance in building a lintel over a window or doorway. Inasmuch as prefabricated slabs are not always available for the purpose, the workman is confronted with a possible layoff and loss of working time while awaiting the delivery of the required material.

The primary object of this invention is to facilitate the production of slabs conforming to the specifications under which the building is being constructed, so as to avoid unnecessary delay in the construction of the building and the possible layoff of the employees engaged in such construction.

Another object is to facilitate the transportation of the mould in which the slabs are cast so that it may be easily transferred from one construction job to another.

A still further object is to facilitate the moulding of slabs of different length so that when an opening of unusual length occurs in a building, a slab may be produced which will adequately supply the need.

The above and other objects may be attained by employing this invention which embodies among its features an elongated base frame having elongated side bars, spacers extending between the side bars adjacent opposite ends thereof, elongated longitudinally extending moulding strips removably disposed within the base frame adjacent the side bars, moulding panels disposed within the base frame adjacent the spacers and in abutting relation to the moulding strips, handles carried by the moulding panels and overlying the side bars and an elongated hopper mounted on the base frame in engagement with the moulding strips and said hopper having notches adjacent opposite ends thereof for accommodating the handles.

Other features include stops carried by the side bars adjacent opposite ends thereof and overlying the spacers, and the hopper having notches therein, the walls of which engage the stops for locating the hopper in proper position on the base frame.

Still other features include means carried at opposite ends of the moulding strips for facilitating their extraction from the base frame, and from around the sides of a slab which has already been cast in the mould.

In the drawings,

Fig. 1 is a top plan view of a mould and hopper embodying the features of this invention, Fig. 2 is a longitudinal sectional view taken substantially along the line 2—2 of Fig. 1, Fig. 3 is a transverse sectional view taken substantially along the line 3—3 of Fig. 2, Fig. 4 is a view similar to Fig. 3 after the hopper has been removed, Fig. 5 is a view similar to Fig. 4 showing the manner in which a straight edge is used for smoothing the top surface of the cast product after the latter has partially set, Fig. 6 is a perspective view of the mould after the hopper has been removed, Fig. 7 is a fragmentary longitudinal sectional view showing the manner in which a transversely extending straight edge is employed in connection with a partially set slab, Fig. 8 is a perspective view of one of the end panels, Fig. 9 is a perspective view of one of the moulding strips, illustrating a tool about to be applied thereto for extracting it from its position in the base frame, Fig. 10 is a plan view of the mould illustrating a removable insert by which a slab of less length than the mould may be produced, Fig. 11 is a longitudinal sectional view through the structure illustrated in Fig. 10, and Fig. 12 is a perspective view of the insert.

Referring to the drawings in detail a base frame designated generally 10 comprises spaced parallel side bars 12 between which extend adjacent opposite ends spacers 14. The side bars 12 and spacers 14 are drilled to receive transversely extending tie bolts 16 having threaded thereon nuts 18 which when clamped in the position shown in Fig. 1 hold the side bars 12 and spacers 14 in relative positions to form the elongated rectangular frame 10. Obviously when the nuts 18 are removed from the bolts 16, the bolts may be extracted from their positions in the side bars 12 and spacers 14 to permit the frame 10 to be knocked down for transportation or storage. Carried by the side bars adjacent opposite ends thereof in overlapping relation with the spacers 14 are stops 20, the purpose of which will hereinafter appear.

With the frame 10 assembled as illustrated in the drawings, moulding strips 22 of slightly less length than the opening within the frame 10 defined by the side bars 12 and the spacers 14 are introduced into the base frame 10 to lie along the inner sides of the side bars 12. These moulding strips 22 are provided at opposite ends with inwardly extending recesses 24 which open through the ends of the bars for the reception of the hooked end 26 of a tool 28 which is employed for removing the moulding strips from the frame 10 after a slab has been cast therein. Elongated substantially rectangular end panels 30 are introduced into the space defined by the side bars 12 and spacers 14, adjacent the spacers and in abutting relation with opposite ends of the moulding strips 12. Each panel 30 is provided intermediate its ends with an inwardly offset portion 32 having a moulding face 34 which is disposed to the inside of the space defined by the side bars 12 and spacers 14 for cooperation with the moulding strips 22 in confining the plastic material within the mould. Carried by opposite ends of the moulding panels 30 are longitudinally extending handle members 36 which when the panels 30 are in place within the frame 10 overlie the top surfaces of the side bars 12 adjacent the spacers 14 and the stops 20.

In order to direct the material into the mould, I provide a hopper designated generally 38 which comprises spaced parallel side bars 40 joined adjacent opposite ends by transversely extending cross bars 42. The side bars 40, when the hopper 38 is in place on the mould, lie on the upper edges of the moulding strips 22 as will be readily understood upon reference to Fig. 3. The end bars 42 of the hopper 38 are, in the preferred form of the invention, disposed beyond the ends of the frame 10 to provide hand holds by which the hopper may be lifted from the frame. Formed in the bottom edges of the side bars 40 of the hopper adjacent opposite ends thereof are relatively deep notches 44 for accommodating the handles 36, and formed adjacent the notches 44 are relatively shallow notches 46, the walls of which engage the stops 20 in order to properly locate the hopper 38 on the base frame 10.

The device thus far described is admirably suited for producing slabs of a length equal to the space defined between the moulding panels 30 when they are in abutting relation to the spacers 14 and in order to produce slabs of lesser length, I introduce between one of the moulding panels 30 and the opposite moulding panel an insert designated generally 48. This insert comprises a pair of spaced end members 50 of a width substantially equal to the width of the moulding strips 22, and joining the members 50 is a bridge piece 52 having notches 54 entering opposite sides thereof intermediate its ends to provide hand holds or finger accommodating recesses so that the device may be easily placed in position in or extracted from the mould.

In use the base frame 10 is assembled as shown and placed on a sheet of paper P or like flexible material which is supported on a flat horizontally extending surface. The moulding strips 22 are then placed in position within the base frame 10 in abutting relation with the side bars 12 with their ends spaced from the spacers 14. The end panels 30 are then placed in position against the spacers 14 and in abutting relation with the ends of the moulding strips 22 so that the moulding faces 34 oppose one another. With the moulding strips 22 and the moulding panels 30 thus disposed within the base frame 10, the hopper 38 is placed in position so that its side members 40 lie on the top edges of the moulding strips 22 and the cross members 42 extending beyond the ends of the base frame 10. The stops 20 cooperating with the walls of the notches 46 will properly locate the hopper 38 longitudinally on the base frame. The plastic mixture is then introduced into the space defined by the moulding strips 22 and panels 30 through the open upper side of the hopper 38 so that the bottom surface of the material being moulded rests on the strip of flexible material or paper P, while the upper surface is exposed to atmosphere. Having filled the space defined by the moulding strips 22 and moulding panels 30 to a level with the top surfaces of the moulding strips 22, the hopper 38 is removed and the top surface of the plastic material is smoothed by moving a straight edge B therealong. After the plastic material has been set within the mould, the moulding panels 30 are lifted upwardly by grasping the handles 36 so as to leave the ends of the moulding strips exposed so that a tool 28 may be introduced into the spaces between the ends of the moulding strips and the spacers 14 with its hook 26 entering the recess 24 to thereby enable the strip 22 to be extracted from its position between the moulded product and the adjacent side bar 12 of the base frame 10. After extraction of both moulding panels 30 and moulding strips 22, the entire frame may be lifted away from the moulded slab and transferred to another position for a repeat operation while the moulded slab is curing. In instances where a slab of less length than the total length of the mould may be required, an insert conforming to the insert 48 may be introduced into the mould with one end resting against one of the moulding panels and the other end forming a dam which will prevent the material being moulded from passing beyond a predetermined point.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In a portable mould for moulding slabs such as lintels, an elongated base frame having elongated side bars, spacers extending between the side bars adjacent opposite ends thereof, elongated longitudinally extending moulding strips removably disposed within the base frame adjacent the side bars, elongated moulding panels disposed within the base frame adjacent the spacers and in abutting relation to the moulding strips, handles carried by the moulding panels and extending outwardly therefrom in overlying relation to the side bars, an elongated hopper mounted on the base frame in engagement with the moulding strips and said hopper having notches therein adjacent opposite ends for accommodating the handles, and the moulding strips having recesses extending thereinto and opening through opposite ends thereof for receiving a tool by which the moulding strips may be lifted out of the base frame.

2. In a portable mould for moulding slabs such as lintels, an elongated base frame having elongated side bars, spacers extending between the side bars adjacent opposite ends thereof, elongated longitudinally extending moulding strips removably disposed within the base frame adjacent the side bars, elongated moulding panels disposed within the base frame adjacent the spacers and in abutting relation to the moulding strips, handles carried by the moulding panels and extending outwardly therefrom in overlying relation to the side bars, an elongated hopper mounted on the base frame in engagement with the moulding strips and said hopper having notches therein adjacent opposite ends for accommodating the handles, stops carried by the side bars and projecting upwardly therefrom adjacent opposite ends thereof the hopper having notches therein for receiving the stops and holding the hopper in proper position on the base frame, the moulding panels having extensions thereon which lie between the moulding strips adjacent opposite ends thereof, and the moulding strips having recesses extending thereinto and opening through opposite ends thereof for receiving a tool by which the moulding strips may be lifted out of the base frame.

ISAAC STEES.

References Cited in the file of this patent

UNITED STATES PATENTS

| Number | Name | Date |
| --- | --- | --- |
| 737,032 | Sicklesteel et al. | Aug. 25, 1903 |
| 747,496 | Spears | Dec. 22, 1903 |
| 790,480 | Crouch | May 23, 1905 |
| 810,343 | Pettyjohn | Jan. 16, 1906 |
| 1,533,830 | Cochran | Apr. 14, 1925 |